United States Patent
Croy et al.

(10) Patent No.: US 10,431,820 B2
(45) Date of Patent: Oct. 1, 2019

(54) HIGH VALENT LITHIATED SURFACE STRUCTURES FOR LITHIUM ION BATTERY ELECTRODE MATERIALS

(71) Applicant: UCHICAGO ARGONNE, LLC, Chicago, IL (US)

(72) Inventors: Jason Croy, Plainfield, IL (US); Mahalingam Balasubramanian, Naperville, IL (US); Joong Sun Park, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 179 days.

(21) Appl. No.: 15/645,678

(22) Filed: Jul. 10, 2017

(65) Prior Publication Data
US 2019/0013518 A1   Jan. 10, 2019

(51) Int. Cl.
*H01M 4/485* (2010.01)
*H01M 4/131* (2010.01)
(Continued)

(52) U.S. Cl.
CPC .......... *H01M 4/485* (2013.01); *H01M 4/131* (2013.01); *H01M 4/1391* (2013.01); *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
CPC ............. H01M 4/485; H01M 10/0525; H01M 2004/028; H01M 4/525
See application file for complete search history.

(56) References Cited

U.S. PATENT DOCUMENTS

| | | | | |
|---|---|---|---|---|
| 5,858,324 A | * | 1/1999 | Dahn | C01G 45/1242 423/50 |
| 6,168,887 B1 | * | 1/2001 | Dahn | H01M 4/505 428/701 |

(Continued)

OTHER PUBLICATIONS

Ceder, G. et al., Identification of Cathode Materials for Lithium Batteries Guided by First-Principles Calculations, Nature 392, 694-696 (1998).

(Continued)

*Primary Examiner* — Rena Dye Cronin
(74) *Attorney, Agent, or Firm* — Olson & Cepuritis, Ltd.

(57) ABSTRACT

The surface of a lithium ion cathode material (e.g., a lithium metal oxide material capable of releasing and accepting lithium ions during charging and discharging, respectively, of a lithium ion electrochemical cell) is coated with a lithium metal oxide (LMO) material comprising a high-valent metal to, inter alia, reduce interfacial resistance toward lithium exchange. Li-rich phases on the surface of the treated LMO particles allow for better lithium ion diffusion. The inclusion of elements that form phases with lithium and can substitute in the host structure allow for mixing across interfaces leading to more robust structures that better mimic epitaxial-type layers. Inclusion of doping elements in place of some of the high-valent metal in the surface-treating composition provides unexpectedly improved performance over surface treatments comprising lithium metal oxides that only include a high-valent metal.

20 Claims, 2 Drawing Sheets

(51) Int. Cl.
*H01M 4/1391* (2010.01)
*H01M 4/36* (2006.01)
*H01M 4/505* (2010.01)
*H01M 4/525* (2010.01)
*H01M 4/02* (2006.01)
*H01M 10/0525* (2010.01)

(56) References Cited

U.S. PATENT DOCUMENTS

| | | | | |
|---|---|---|---|---|
| 8,277,683 | B2* | 10/2012 | Deng | H01M 4/0471 |
| | | | | 252/182.1 |
| 9,406,928 | B2 | 8/2016 | Kokado et al. | |
| 2003/0108793 | A1* | 6/2003 | Dahn | C01G 45/1221 |
| | | | | 429/224 |
| 2010/0086854 | A1* | 4/2010 | Kumar | H01M 4/505 |
| | | | | 429/223 |
| 2014/0162113 | A1 | 6/2014 | Ohta et al. | |
| 2014/0162126 | A1* | 6/2014 | Cho | H01M 4/366 |
| | | | | 429/224 |
| 2016/0260965 | A1* | 9/2016 | Wu | H01M 4/139 |
| 2016/0315315 | A1* | 10/2016 | Olken | C01G 45/1228 |
| 2016/0359165 | A1* | 12/2016 | Kim | C01G 53/42 |
| 2017/0301916 | A1* | 10/2017 | Shin | C01D 15/00 |

OTHER PUBLICATIONS

Croy, J.R. et al., Prospects for Spinel-Stabilized, High-Capacity Lithium-Ion Battery Cathodes, Journal of Power Sources 334, 213-220 (2016).

Hayashi, T. et al., Contribution of Randomly Oriented Li2WO4 With Tetragonal Symmetry to Li+ Ion Transfer Resistance Reduction in Lithium-Ion Batteries, Int. Journal of Electrochemical Science 10, 8150-8157 (2015).

Huang, S. et al., Transition-Metal-Doped M-Li8ZrO6 (M=Mn, Fe, Co, Ni, Cu, Ce) As High-Specific-Capacity Li-Ion Battery Cathode Materials: Synthesis, Electrochemistry, and Quantum Mechanical Characterization, Chemistry of Materials 28, 746-755 (2016).

Kong, F. et al., Multivalent Li-Site Doping of Mn Oxides for Li-Ion Batteries, Journal of Physical Chemistry 119, 21904-21912 (2015).

Long, B.R. et al., Advances in Stabilizing 'Layered-Layered' xLi2MnO3.(1-x)LiMO2 (M=Mn, Ni, Co) Electrodes With Spinel Component, Journal of the Electrochemical Society 161 (14), A2160-A2167 (2014).

* cited by examiner

HIGH VALENT LITHIATED SURFACE STRUCTURES FOR LITHIUM ION BATTERY ELECTRODE MATERIALS

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to modification of lithium ion electrode-particle surfaces.

BACKGROUND

Lithium ion batteries are widely used as power sources because they provide high power with low resistance. Defects in performance stem from hindered $Li^+$ diffusion at the interface between the positive electrode and electrolyte. Lithium ion batteries are used in a broad range of applications and are currently being used to power the next-generation of electric vehicles. However, state-of-the-art lithium ion electrode materials do not meet, simultaneously, the criteria for high power, high energy, and long life necessary for transportation applications. Lithium ion batteries are limited in the energy they can practically deliver due to surface reactivity, i.e., electrode/electrolyte interactions. Surface changes become a significant factor in cell degradation much earlier than bulk structural changes of electrode materials.

A major challenge for all lithium ion chemistries is the degradation of electrode-particle surfaces under high-voltage/high-energy operation. Serious degradation phenomena involve the interaction of oxidized transition metals (TMs) with organic electrolytes leading to surface-film deposition, TM dissolution, the release of oxygen, and subsequent reorganization of surface layers. These mechanisms lead to a loss of available lithium, a decrease in the power and energy of cells, and a decrease in the cycle life of cells.

Typical surface protection strategies involve the use of a physical barrier to isolate the electrode surface from the electrolyte. These physical barriers can still be etched by the electrolyte, crack, separate from the surface, and cause increased impedance. There is an ongoing need for improving electrode surface stability, thus, improving power and energy capabilities as well as extending cycle life in lithium ion batteries. The materials disclosed herein address this need.

SUMMARY

This invention relates to surface modification of cathode materials for lithium ion batteries. As described herein, the surface of a lithium ion cathode material (e.g., a lithium metal oxide (LMO) material (e.g., $LiMO_2$, where M is one or more transition metals such as Mn, Co, and/or Ni, optionally doped with one or more other metal such as Ti, Al, and the like) capable of releasing and accepting lithium ions during charging and discharging, respectively, of a lithium ion electrochemical cell) is treated with a lithium metal oxide material comprising a high-valent metal (i.e., a metal with an oxidation state of +5 or +6) to, inter alia, reduce interfacial resistance toward lithium exchange. The high-valent lithium metal oxide material comprises a compound of empirical Formula (I): $Li_xM'_nM''_mA_z$, wherein $1 \leq x \leq 3$; $2 \leq z \leq 4$; $0.5 \leq n \leq 2$; and $0.05 \leq m \leq 1$, $m < n$; and $0.05 \leq n+m \leq 3$. M' comprises, consists essentially of, or consists of one or more 5+ and/or 6+ oxidation state metals having an average oxidation state, w, wherein $5 \leq w \leq 6$. M'' comprises, consists essentially of, or consists of one or more 2+ and/or 3+ oxidation state metals having an average oxidation state, t, wherein $2 \leq t \leq 3$. A comprises, consists essentially of, or consists of one or more anions having an average oxidation state, v, wherein $-3 \leq v \leq -1$. In Formula (I), $x+(n)(w)+(m)(t)=-(v)(z)$; i.e., the total formal negative charge of $A_z$ balances the combined formal positive charge of $Li_xM'_nM''_m$ in Formula (I).

Preferably, A is a monovalent, divalent or trivalent anion or negative oxidation state element, such as $O^{2-}$ (i.e., $z=-2$), (i.e., $z=-1$), $N^{2-}$ (i.e., $z=-2$), a phosphate ion (e.g., $PO_4^{3-}$, $HPO_4^{2-}$, and the like), or a combination of two or more thereof. More preferably, A is $O^{2-}$. M' preferably is a metal or a mixture of metals having oxidation states of 5 or 6, such as W(VI), Nb(V), Sb(V), Ta(V) and the like. M'' preferably is a dopant metal such as Ni(II), Mg(II), Al(III) Ga(III), Y(III), La(III), and the like. As used here, the term "metal" in reference to Formula (I) and LMO compounds refers to metallic elements (e.g., alkali metals, alkaline earth metals, transition metals, and main group metals) as well as metalloid elements (e.g., Ge, and Sb). In some embodiments, M'' can induce various vacancy concentrations within the structure of the compound of Formula (I).

The value of n+m can influence substitution of M' and/or M'' ions into lattice sites of the LMO particles. Optionally, the compound of Formula (I) can penetrate into the bulk of the LMO particles, as well. In some embodiments, there is a concentration gradient for the compound of Formula (I) and the LMO, such that the concentration of Formula (I) is highest at the surface of the LMO particles and decreases from the surface into the bulk of the LMO.

With some materials of Formula (I), metal diffusion can occur with the LMO, thereby creating mixed layers having different metal ion compositions in each layer and a robust surface-to-bulk transition. Additionally, these materials can contain unique structures and/or vacancy concentrations that are beneficial to electrochemical performance. Some non-limiting advantages of using compositions of Formula (I) for surface treatment of LMOs include: (1) enhanced stability to oxidation due to the high-valent metals (M'); (2) the presence of over-lithiated phases (i.e., phases with excess lithium), which provide for good lithium conduction and allow for disorder while retaining lithium mobility; (3) thin grain-boundary layers which can be used to stabilize internal domains; (4) cation mixing between the LMO and surface layers giving a strong connection of the composition of Formula (I) with the bulk LMO material; (5) M' substitution can create vacancies in the host LMO, which allows for enhanced Li diffusion; and (6) M'' substitution can create vacancies in the crystal structures of Formula (I) which allows for enhanced Li diffusion.

Non-limiting examples of LMO cathode materials useful in the compositions and methods described herein include, e.g., $Li_{1+p}MO_2$ ($0<p<0.3$), $LiMO_2$, $Li_2MO_3$, $LiM_2O_4$, combinations thereof, or integrated composites thereof (e.g., layered-layered, layered-spinel, or layered-layered-spinel compositions such as $qLiMO_2 \cdot (1-q)Li_2MO_3$, $qLiMO_2 \cdot (1-q)LiM_2O_4$, $r[qLiMO_2 \cdot (1-q)Li_2MO_3] \cdot (1-r)LiM_2O_4$ and the like, where $0<p<1$, $0<q<1$, and $0<r<1$, and in which M comprises one of more transition metal ions, typically, Mn, Ni, Co, or a combination of two or more thereof, optionally doped with one or more metals such as Ti, Zr, Ge, Al, and the like, as is well known in the art.

M' and M", while forming unique phases with lithium, can also be substituted into lattice sites of the host structure enabling mixing of M', M" and, for example, the metal, M, in a lithium metal oxide cathode material such as $Li_{1+p}MO_2$ (0<p<0.3), $LiMO_2$, $Li_2MO_3$, $LiM_2O_4$, combinations thereof, or integrated composites thereof (e.g., where M is Mn, Ni, Co or a combination of two or more thereof), across the surface-to-bulk interface leading to strong interactions between surface and bulk.

In a method aspect, particles of an LMO cathode material are treated with a compound of Formula (I) by, for example, dissolving soluble precursors materials for preparing a composition of Formula (I) (e.g., metal oxides, salts, and the like) in water or a non-aqueous solvent (e.g., an alcohol) followed by the addition of the LMO cathode material under constant stirring and subsequent drying at low temperature (e.g., about 80° C.). Annealing the dried mixture of LMO and precursor compounds at a temperature of about 300° C. to 900° C. produces the surface-treated lithium metal oxide (LMO) cathode material. The annealing can be carried out in air or in a controlled environment (e.g., at a controlled oxygen partial pressure, or with ammonia doping to produce $N^{2-}$ anions) depending on the desired composition of Formula (I) and the desired outcome (e.g., desired mixing across the coating/bulk interface and/or diffusion into the bulk of cathode particles).

Alternatively, solid state precursors of Formula (I) may also be mixed directly with LMO particles, or with a precursor of the LMO, e.g., during the lithiation step of LMO annealing, followed by the desired, final annealing at, e.g., 300° C. to 900° C., under the desired environmental conditions (e.g., under air, inert gas, controlled oxygen partial pressure, controlled ammonia partial pressure, and the like). Other methods, well-known in the art such as dry coating technologies and atomic layer deposition are also envisioned as possible methods of treating the LMO with a composition of Formula (I). In addition, co-precipitation routes whereby elements of Formula (I) are incorporated into the fabrication of LMO precursor materials, prior to lithiation, are envisioned as possible starting routes to the final product of LMO particles treated with the materials of Formula(I).

The M' and M" elements in Formula (I) may form unique lithiated phases and can also be substituted in to the lattice sites of the host LMO structure. Li-rich phases on the surface of the treated LMO particles allow for better lithium ion diffusion relative to untreated LMO. The inclusion of elements that form phases with lithium and can substitute in the host structure allow for mixing across interfaces leading to more robust structures that better mimic epitaxial-type layers. Inclusion of the doping element (M") in place of some of the high-valent metal in the surface-treating composition provides unexpectedly improved performance over surface treatments comprising lithium metal oxides that only include a high-valent metal, such as $Li_2WO_4$.

Non-limiting examples of certain embodiments of the cathode materials, cells and batteries described herein include:

Embodiment 1 is a surface-treated lithium metal oxide (LMO) cathode material comprising: (a) particles of an LMO material capable of releasing and receiving lithium ions during discharging and charging, respectively, of a lithium ion electrochemical cell; and (b) a compound of empirical Formula (I) on at least the surface of the LMO particles: (I): $Li_xM'_nM''_mA_z$, wherein $1 \le x \le 3$; $2 \le z \le 4$; $0.5 \le n \le 2$; $0.05 \le m \le 1$; $m < n$; $0.05 \le n+m \le 3$; M' comprises, consists essentially of, or consists of one or more metals with oxidation states of 5+ or 6+ and a having an average oxidation state, w, wherein $5 \le w \le 6$; M" comprises, consists essentially of, or consists of one or more metals with oxidation states of 2+ or 3+, and having an average oxidation state, t, wherein $2 \le t \le 3$; A is one or more anions having an average oxidation state, v, wherein $-3 \le v \le -1$; and $x+(n)(w)+(m)(t)=-(v)(z)$.

Embodiment 2 is the cathode material of Embodiment 1, wherein A is selected from the group consisting of A is $O^{2-}$ (i.e., z=-2), $F^-$ (i.e., z=-1), $N^{2-}$ (i.e., z=-2), a phosphate ion (e.g., $PO_4^{3-}$, $HPO_4^{2-}$, and the like), and a combination of two or more thereof.

Embodiment 3 is the cathode material of Embodiment 1 or 2, wherein A is $O^{2-}$.

Embodiment 4 is the cathode material of any one of Embodiments 1-3, wherein $0.7 \le n \le 1.5$.

Embodiment 5 is the cathode material of any one of Embodiments 1-4, wherein $0.2 \le m \le 0.8$.

Embodiment 6 is the cathode material of any one of Embodiments 1-5, wherein $1 \le n+m \le 2.5$.

Embodiment 7 is the cathode material of any one of Embodiments 1-6, wherein M' comprises one or more metals selected from the group consisting of W(VI), Nb(V), Sb(V), Ta(V), and the like.

Embodiment 8 is the cathode material of any one of Embodiments 1-7, wherein M' comprises W(VI).

Embodiment 9 is the cathode material of any one of Embodiments 1-8, wherein M" comprises one or more metals selected from the group consisting of Ni(II), Mg(II), Al(III) Ga(III), Y(III), La(III), and the like.

Embodiment 10 is the cathode material of any one of Embodiments 1-9, wherein M" comprises Al(III).

Embodiment 11 is the cathode material of Embodiment 1, wherein the compound of Formula (I) comprises $Li_2W_{0.85}Al_{0.3}O_4$.

Embodiment 12 is the cathode material of any one of Embodiments 1-11, wherein the LMO comprises one or more materials selected from the group consisting of $Li_{1+p}MO_2$ (0<p<0.3), $LiMO_2$, $Li_2MO_3$, $LiM_2O_4$, and an integrated composite of two or more thereof; and wherein M comprises one or more transition metal ions.

Embodiment 13 is the cathode material of Embodiment 12, wherein M comprises one or more transition metals selected from Mn, Ni, and Co.

Embodiment 14 is the cathode material of any one of Embodiments 1-11, wherein the LMO comprises $LiMO_2$; and wherein M comprises one or more transition metals selected from Mn, Ni, and Co.

Embodiment 15 is the cathode material of Embodiment 1, wherein the LMO material comprises $LiCoO_2$ and the compound of Formula (I) comprises $Li_2W_{0.85}Al_{0.3}O_4$.

Embodiment 16 is the cathode material of Embodiment 1, wherein M' is one or more metals having an average oxidation state of +6, and comprises W(VI); and A is O.

Embodiment 17 is the cathode material of Embodiment 1, wherein M' is one or more metals having an average oxidation state of +5; and A is O.

Embodiment 18 is the cathode material of Embodiment 17, wherein M' comprises one or more of Nb(V), Sb(V), and Ta(V).

Embodiment 19 is an electrochemical cell comprising a cathode, an anode and a lithium-containing non-aqueous electrolyte therebetween, wherein the cathode comprises a cathode material of any one of Embodiments 1-18.

Embodiment 20 is a battery comprising a plurality of electrochemical cells of Embodiment 18 electrically connected together in series, parallel, or a combination of series and parallel.

DETAILED DESCRIPTION

As disclosed herein, lithiated high-valent compositions of empirical Formula (I), $Li_xM'_nM''_mA_z$, are deposited on at least the surface of lithium metal oxide (LMO) cathode materials (e.g., $LiCoO_2$ and the like). In Formula (I), M' is a metal (or combination of metals) with oxidations states or 5 or 6, with an average positive oxidation state of w ($5 \leq w \leq 6$). M'' is a metal (or combination of metals) having oxidation states of 2 or 3, having an average positive oxidation state of t ($2 \leq t \leq 3$). A is an anion (or a combination of anions) having an average formal negative charge or negative oxidation state of v ($-3 \leq v \leq -1$), such that when v is multiplied by z, the combined formal negative charge of $A_z$ balances the combined formal positive charge of $Li_xM'_nM''_m$ in Formula (I), i.e., $x+(n)(w)+(m)(t)=-(v)(z)$.

In Formula (I), $1 \leq x \leq 3$; $2 \leq z \leq 4$; $0.5 \leq n \leq 2$; $0.05 \leq m \leq 1$; $m<n$; $0.05 \leq n+m \leq 3$. In some embodiments: $1 \leq n+m \leq 2.5$, or $1 \leq n+m \leq 2$, $1 \leq n+m \leq 1.5$, or $1 \leq n+m \leq 1.2$; $1 \leq x \leq 2.5$, $1 \leq x \leq 2$, or $1 \leq x \leq 1.5$; $0.6 \leq n \leq 1.5$, or $0.7 \leq n \leq 1$; and $0.1 \leq m \leq 0.9$, or $0.2 \leq m \leq 0.8$.

In Formula (I), A is one or more anions or negative oxidation state elements with an average oxidation state (or formal charge) v, wherein $-3 \leq v \leq -1$. Preferably, A comprises $O^{2-}$ (i.e., z=−2), $F^-$ (i.e., z=−1), $N^{2-}$ (i.e., z=−2) a phosphate ion (e.g., $PO_4^{3-}$, $HPO_4^{2-}$, and the like), or a combination of two or more thereof; more preferably A is $O^{2-}$.

In Formula (I), M' is a high-valent metal of 5+ or 6+ oxidation state. Non-limiting examples of M' include W(VI), Nb(V), Sb(V), Ta(V) and the like. In Formula (I), M'' is one or more dopant metals that have oxidations states of 2+ or 3+, which preferably induce various vacancy concentrations within the structure of Formula (I) and/or of the LMO. Non-limiting examples of M'' include Ni(II), Mg(II), Al(III), Ga(III), Y(III), La(III), and the like. In some embodiments M' comprises, consists essentially of, or consists of W(VI). In some embodiments, M'' comprises, consists essentially of, or consists of ARM).

M' and M'', while forming unique phases with lithium, can also substitute into lattice sites of the host LMO structure enabling mixing of M', M'' and the metal, M, in the LMO cathode material across a surface-to-bulk interface, leading to strong interactions between the surface and bulk compositions. In some cases a composition of Formula (I) can interact with an LMO, such that some M'' can insert into the LMO forming a composition with less Al at the surface and some Al substituted into the LMO and/lithium aluminum oxide-type surface phases. For example, a composition of formula $Li_2W_{0.85}Al_{0.3}O_4$ may interact with an LMO such as $LiCoO_2$, such that some of the $Al^{3+}$ of $Li_2W_{0.85}Al_{0.3}O_4$, e.g., approximately 0.15 $Al^{3+}$, migrates and forms a composition of formula $Li_2W_{0.85}Al_{0.15}O_{3.78}$ on the surface, with the 0.15 Al substituting into the LMO structure, or forming lithium aluminum oxide-type surface phases on the LMO.

In some embodiments of Formula (I), A is $O^{2-}$ and M' has a +6 oxidation state (e.g., when M' comprises W(VI)). As one specific example, such compositions can be written as Formula (II): $Li_2M'_nM''_mO_4$, e.g., where $0.5 \leq n \leq 0.95$; m=6(1−n)/t; m<n; and M' comprises W(VI); and wherein optionally, the proportions of Li and O can vary somewhat (e.g., by about 0.001% to about 30%) from the ideal values of 2 and 4, respectively, so long as the formal positive and negative charges balance each other.

Likewise, in some embodiments of Formula (I), A is $O^{2-}$ and M' has a 5+ oxidation state (e.g., M' comprises Nb(V)) and M'' can have a 2+ or 3+ oxidation state. As one specific example, such compositions can be written as Formula (III): $Li_{2-x}M'_nM''_mO_3$ where $0.5 \leq n \leq 0.95$; $0.05 \leq m \leq 0.3$; n>m; and $0 \leq x \leq 1$; and wherein the combined formal positive charge from Li, M' and M'' (6+) balances the formal negative charge of the oxygens (6−).

In another example, A is $O^{2-}$, M' has a 5+ oxidation state, and M'' has a 2+ oxidation state (e.g., where M' comprises Sb(V) and M'' comprises Ni(II)). As one specific example, such compositions can be written as Formula (IV): $Li_3M'_nM''_mO_4$, $0.5 \leq n \leq 0.95$; m=5(1−n)/t; n>m; and wherein optionally, the proportions of Li and O can vary somewhat (e.g., by about 0.001% to about 30%) from the ideal values of 3 and 4, respectively, so long as the formal positive and negative charges balance each other.

Also described herein are electrochemical cells comprising a cathode, an anode and a lithium-containing non-aqueous electrolyte therebetween, the cathode comprises a cathode material which is a surface-treated lithium metal oxide (LMO) cathode material comprising: (a) particles of an LMO material capable of releasing and receiving lithium ions during discharging and charging, respectively, of a lithium ion electrochemical cell (e.g., an LMO as described above); and (b) a compound of empirical Formula (I), (II), or (III) on the surface of the LMO particles. A plurality of the electrochemical cells can be joined in series, parallel or both series and parallel to form a battery.

The LMO component of the surface-treated cathode materials described herein can comprise, consist essentially of, or consist of any lithium-ion cathode material, e.g., $Li_{1+p}MO_2$ (0<p<0.3), $LiMO_2$, $Li_2MO_3$, $LiM_2O_4$, combinations thereof, or integrated composites thereof (e.g., layered-layered, layered-spinel, or layered-layered-spinel compositions such as $qLiMO_2 \cdot (1-q)Li_2MO_3$, $qLiMO_2 \cdot (1-q)LiM_2O_4$, $r[gLiMO_2 \cdot (1-q)Li_2MO_3] \cdot (1-r)LiM_2O_4$ and the like, where 0<p<1, 0<q<1, and 0<r<1, and in which M comprises one of more transition metal ions, typically, Mn, Ni, Co, or a combination of two or more thereof, optionally doped with one or more metals such as Ti, Zr, Ge, Al, and the like, as is well known in the art.

M' and M", while forming unique phases with lithium, can also be substituted into lattice sites of the host structure enabling mixing of M', M" and, for example, the metal, M, in a lithium metal oxide cathode material such as $Li_{1+p}MO_2$ (0<p<0.3), $LiMO_2$, $Li_2MO_3$, $LiM_2O_4$, combinations thereof, or integrated composites thereof (e.g., where M is Mn, Ni, Co or a combination of two or more thereof), across the surface-to-bulk interface leading to strong interactions between surface and bulk.

In some embodiments, the LMO material comprises, consists essentially of, or consists of $LiMO_2$ in which M comprises one or more transition metal ions selected from Mn, Ni, Co or a combination of two or more thereof, optionally doped with one or more metals such as Al, Ti, Zr, Ge and the like.

In one embodiment, the LMO material comprises, consists essentially of, or consists of $LiCoO_2$ and the compound of Formula (I) comprises, consists essentially of, or consists of $Li_2W_{0.85}Al_{0.3}O_4$.

The use of high-valent, inactive elements such as W(VI), Nb(V), Sb(V), in Li-rich phases helps to stabilize the surface of lithium ion cathode materials, such as a lithium metal oxide cathode material such as $Li_{1+x}MO_2$ (0≤x≤0.3), $LiMO_2$, $Li_2MO_3$, $LiM_2O_4$, combinations thereof, or integrated composites thereof (e.g., where M is Mn, Ni, Co or a combination of two or more thereof), through strong metal-oxygen interactions. Suitable synthesis conditions allow for a gradual transition from a thin outer layer of Formula (I) on particles of a lithium metal oxide (LMO) cathode material, to an intermediate layer of Formula (I) combined, blended, integrated, or doped with the LMO elements, to a bulk layer of LMO combined, blended, integrated of doped with Formula (I) elements. Specifically, the range of time and temperatures used, in combination with the annealing atmosphere (e.g., oxygen partial pressure), along with the appropriate choice of Formula (I) and LMO material are chosen to facilitate mixing, with higher temperatures (and/or longer times) leading to a higher degree of mixing and interdiffusion, and lower temperatures (and/or shorter times) leading to surface-concentrated phases. Use of Li-rich phases allow for diffusion channels connecting domains of the various higher valent metals and elements. Use of high-valent (+5 or +6 oxidation state) elements allows for oxygen stability. Interfaces made of these types of materials enable, at least in some cases, lithium extraction from adjacent domains and oxygen stability, e.g., stabilization of Li- and Mn-rich domains in composites.

The electrode materials described herein can have structures that include one or more imperfections, for example, cation disorder, stacking faults, dislocations, structural defects and vacancies, and localized non-stoichiometry.

Optionally, the electrode materials described herein can include other traditional surface treatments. For example, the electrode materials can be treated under acidic conditions to improve, symbiotically, surface stability and/or first-cycle efficiency. The surface treatment of the electrode materials under acidic conditions preferably takes place in the presence of nitrate ions and one or more soluble, surface stabilizing metal cations, for example, aluminum and/or zirconium ions.

Additionally or alternatively, the surfaces of the electrode materials can be treated to include, for example, metal-oxide, metal-fluoride, or metal-phosphate layers or coatings that do not fall within Formula (I) to protect the electrode materials from highly oxidizing potentials in the cells and/or from other undesirable effects, such as electrolyte oxidation, oxygen loss, and/or dissolution. Such surface protection/modification can enhance the surface stability, rate capability and cycling stability of the electrode materials. In some embodiments, individual particles of a powdered electrode material, a surface of the formed electrode, or both, are coated or treated, e.g., in situ during synthesis or post synthesis, for example, with a metal oxide, a metal fluoride, a metal polyanionic material, or a combination thereof. Non-limiting examples of such coatings include (a) lithium fluoride, (b) aluminum fluoride, (c) a lithium-metal-oxide in which the metal is selected preferably, but not exclusively, from the group consisting of Al and Zr, (d) a lithium-metal-phosphate in which the metal is selected from the group consisting preferably, but not exclusively, of Fe, Mn, Co, and Ni, and (e) a lithium-metal-silicate in which the metal is selected from the group consisting preferably, but not exclusively, of Al and Zr.

The constituents of the treatment or coating, such as the aluminum and fluoride ions of an $AlF_3$ coating, the lithium and phosphate ions of a lithium phosphate coating, or the lithium, nickel and phosphate ions of a lithium-nickel-phosphate coating can be incorporated in a solution that is contacted with the electrode material. For example, the surface may be treated with fluoride ions, e.g., using $NH_4F$, in which case the fluoride ions may substitute for an anion such as oxygen at the surface or at least partially within the bulk of the structure of the electrode material.

EXAMPLES

Comparative Example. Preparation of $LiCoO_2$ Surface-Treated with $Li_2WO_4$ A cathode material comprising $LiCoO_2$ surface-treated with $Li_2WO_4$ was prepared by mixing the desired amount of $Li_2WO_4$ in water under constant stirring at about 80° C. $LiCoO_2$ particles were subsequently added and the solution was evaporated under constant stirring at about 90° C. and dried overnight at about 110° C. The coated $LiCoO_2$ powders were subsequently annealed, in air at 550° C. for about 6 hours.

Example 1. Preparation of $LiCoO_2$ Surface-Treated with $Li_2W_{0.85}Al_{0.3}O_4$ A cathode material comprising $LiCoO_2$ surface-treated with a composition of nominal formula, $Li_2W_{0.85}Al_{0.3}O_4$, was prepared by mixing the desired amounts of $Li_2WO_4$ and $Al(NO_3)_3 \cdot 9H_2O$ in water under constant stirring at about 80° C. $LiCoO_2$ particles were subsequently added and the solution was evaporated under constant stirring at about 90° C. and dried overnight at about 110° C. The coated $LiCoO_2$ powders were subsequently annealed, in air at 550° C. for about 6 hours.

Example 2. Preparation of a $Li_{1.078}Mn_{0.476}Ni_{0.251}Co_{0.170}O_2$, Lithium- and Manganese-Rich, Layered-Layered-Spinel, Surface-Treated with $Li_2W_{0.85}Al_{0.3}O_{4-\delta}F_\delta$ A cathode material comprising a lithium- and manganese-rich, $Li_{1.078}Mn_{0.476}Ni_{0.251}CO_{0.17}O_2$ (layered notation), layered-layered-spinel (LLS), as described in Croy et al., *Journal of Power Sources*, 334, (2016) 213 and Long et al., *Journal of the Electrochemical Society*, 161, (2014) A2160, was surface treated with $Li_2W_{0.85}Al_{0.3}O_{4-\delta}F_\delta$, where the targeted Al:F mole ratio was equal to about 1, with an estimated actual F⁻ substitution, δ, of 0<δ≤0.3. The material was prepared by mixing the desired amounts of $Li_2WO_4$, $Al(NO_3)_3 \cdot 9H_2O$, and $NH_4F$ in water under constant stirring at about 80° C. The LLS cathode particles were subsequently added and the solution was evaporated under constant stirring at about 90° C. and dried overnight at about 110° C. The coated cathode powders were subsequently annealed, in air at about 550° C. for about 6 hours.

Figure 1:
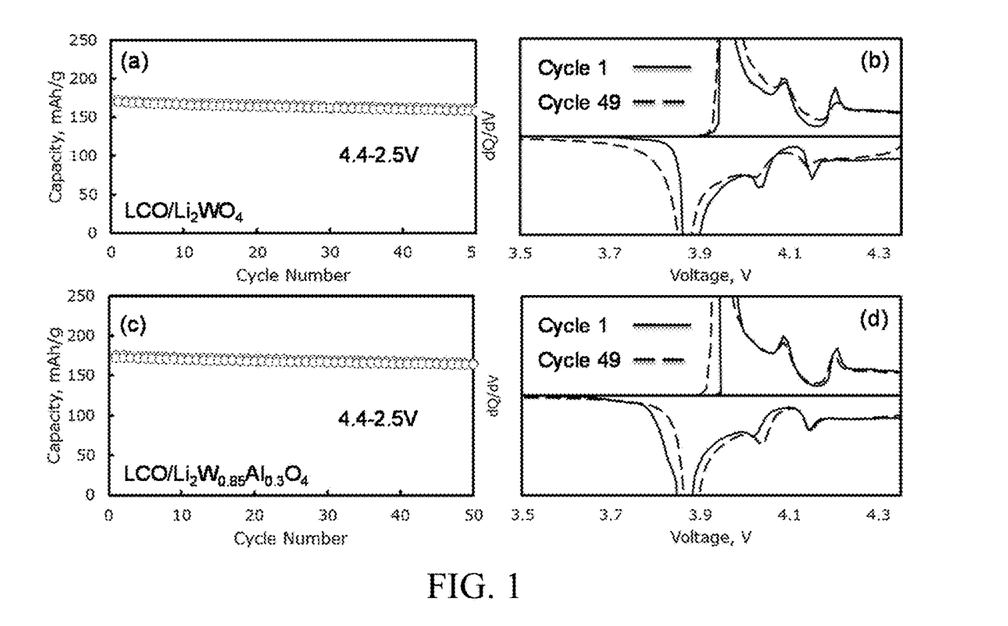
FIG. 1 shows (a) a capacity vs. cycle number plot for a comparative composition comprising $LiCoO_2$ modified by 2 wt % $Li_2WO_4$ and (b) the corresponding differential capacity plots for the comparative composition of (a); (c) a capacity vs. cycle number plot for $LiCoO_2$ (LCO) modified by an Al-substituted high-valent lithium metal oxide, $Li_2W_{0.85}Al_{0.3}O_4$, exemplary of an embodiment of the present invention, and (d) the corresponding differential capacity plots for the composition of (c). Cells were cycled against Li metal anodes between about 4.4 and about 2.5 V at a rate of about 20 mA/g at about 30° C.

Example 3. Electrochemical Evaluation of $LiCoO_2$ Materials Surface-Treated with $Li_2WO_4$ (Comparative) and with $Li_2W_{0.85}Al_{0.3}O_4$ An example of a surface-modified cathode material is an Al-substituted lithium tungsten oxide ($Li_2W_{0.85}Al_{0.3}O_4$) deposited on a $LiCoO_2$ (LCO) cathode material, prepared in Example 1. FIG. 1, Panels (a) and (b) show data on the electrode material of the Comparative Example (i.e., LCO that has been surface-treated with about 2 wt % of $Li_2WO_4$) cycled between about 4.4 and about 2.5V vs. Li. Pure LCO is well-known to quickly degrade when cycled above about 4.2 V vs. Li, and survives relatively few cycles when charged to 4.4 V. FIG. 1, Panel (a) shows that the comparative $Li_2WO_4$/LCO cell achieves a constant capacity of about 170 mAh/g over about 50 charge/discharge cycles. FIG. 1, Panel (b) shows differential capacity (dQ/dV) plots of cycles 1 and 49 of the comparative example. The ordering transitions that occur between about 4.0 V to about 4.2 V are marked by the double peaks in FIG. 1, Panel (b) and are an excellent indicator of order in the layered LCO structure. This order is known to decrease substantially on cycling due to surface degradation, and adequate protection of LCO surfaces leads to stabilization of these marker peaks. As shown in FIG. 1, Panel (b), the transition peaks are still observed after about 50 cycles, although degrading with increased cycling.

In contrast, FIG. 1, Panels (c) and (d), show data on the electrode material of Example 1, which is an LCO cathode modified by an Al-substituted lithium tungsten oxide of nominal empirical formula $Li_2W_{0.85}Al_{0.3}O_4$ (i.e., a compound of Formula (I) in which M' is W(VI), M" is Al(III), A is O, x is 2, y is 1, m is 0.85, n is 0.3, and z is 4). This example achieves a constant capacity of about 170 mAh/g over about 50 cycles between about 4.4 V and about 2.5 V. The incorporation of Al into the "$Li_2WO_4$"-like structure noticeably, and unexpectedly improved the stability of the material as indicated by the improved stability (i.e., retention) of the double peaks between about 4.0 V and 4.2 V in the dQ/dV plot of FIG. 1, Panel (d).

The results in FIG. 1 indicate that prior art $Li_2W^{6+}O_4$ treatment may provide some surface protection, while a doped material of Formula (I), e.g., with Al substitution in place of some Li/W and/or mixing across the interface between the $Li_2WO_4$-like structure and the underlying $LiCoO_2$ structure, improves cycling stability beyond that of the $Li_2WO_4$ composition without any lower-valent metal (M") doping. Lithiated W-oxide structures in which the W is nominally $W^{6+}$ cannot be oxidized, and are capable of allowing lithium transport through cathode surfaces while providing some level of surface protection. Substitution of Al into the W-oxide and diffusion/mixing with the underlying $LiCoO_2$ compound noticeably and unexpectedly improves surface stability over the non-substituted W compound. X-ray studies suggest that the new structures may become at least a part of the bulk structure of the LMO cathode material, which introduces an epitaxial structure that contains Li. The introduced tungsten-Li structure serves to stabilize the surface structure of the primary LMO cathode material upon cycling.

Figure 2:
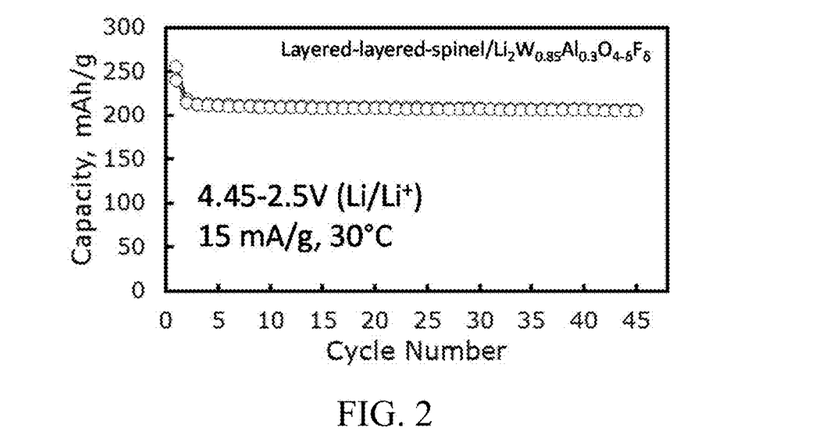
FIG. 2 shows a capacity vs. cycle number plot for an electrode material comprising an aluminum-doped lithium tungsten oxide material of Formula (I) coated on LLS including partial substitution of F— for oxygen in the compound of Formula (I).

Example 4. Electrochemical Evaluation of Li- and Mn-Rich Layered-Layered-Spinel Materials Surface-Treated with $Li_2W_{0.85}Al_{0.3}O_{4-\delta}F_\delta$ An example of a surface-modified cathode material is an Al- and F-substituted lithium tungsten oxide ($Li_2W_{0.85}Al_{0.3}O_{4-\delta}F_\delta$) deposited on a lithium- and manganese-rich, layered-layered-spinel (LLS) cathode material, prepared in Example 2. FIG. 2 shows data on the electrode material cycled between about 4.4 and about 2.5 V vs. Li, after a first-cycle activation between about 4.6 and 2.0 V. Of particular interest is the first-cycle efficiency. Low first-cycle efficiencies, typically below about 85%, are a known problem for lithium-rich cathode electrode materials. LLS materials have been shown to increase this efficiency to around 90%. Surface treatments can increase efficiencies even further by successfully mitigating unwanted side reactions with electrolyte components. The LLS electrode coated as described in Example 2 gives a first-cycle efficiency of about 94%. This efficiency is on par with current, state-of-the-art, lithiated metal-oxide, cathode electrode materials and indicates the efficacy of the surface treatment with respect to protecting the cathode particle surfaces. Subsequent cycling between about 4.45 V and 2.5 V shows that the treated electrode material can maintain stable, high capacities (>200 mAh/g) over the 50 cycles on test.

When materials of Formula (I), along with similar, lithiated metal-fluorides and phosphates, are doped with select elements and synthesized under specific conditions, some amount of metal diffusion occurs, thereby creating mixed layers and a robust surface-to-bulk transition. Furthermore, these materials contain unique structures and/or vacancy concentrations that are beneficial to electrochemical performance. Some advantages of using compositions of Formula (I) for surface treatment of LMOs include: (1) using high-valent metals provides increased metal-oxygen stability; (2) over-lithiated phases provides good lithium conductors and allow for disorder while retaining lithium mobility; (3) thin grain-boundary layers can form to stabilize internal domains; (5) an appropriate mix of M, M', and M" in the treated LMO allows for cation mixing within the surface layers giving a strong connection with bulk material; (6) M' substitution can create vacancies in the host LMO, which allows for enhanced Li diffusion; and (7) M" substitution can create vacancies in the structures of Formula (I) which allows for enhanced Li diffusion.

Electrochemical Testing

Coin cells were constructed in an argon-filled glove box (<5 ppm $O_2$ and $H_2O$) for the electrochemical experiments. The cathode consisted typically of 84 wt % of lithium-metal-oxide powder, 8 wt % carbon, and 8 wt % polyvinylidene difluoride (PVDF) binder on aluminum foil. The anodes used were metallic lithium. The electrolyte consisted of a 1.2 M $LiPF_6$ solution in ethylene carbonate and ethylmethyl carbonate (3:7 mixture). For the cycling experiments, the cells were galvanostatically charged and discharged typically between about 2.0 V and 4.4 V at a current rate of 15 mA/g at a temperature of about 30° C.

An Exemplary Electrochemical Cell

Figure 3:
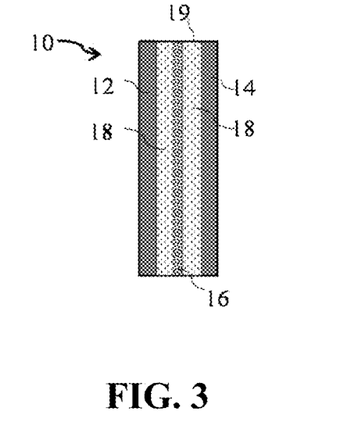
FIG. 3 schematically illustrates an electrochemical cell.
Figure 4:
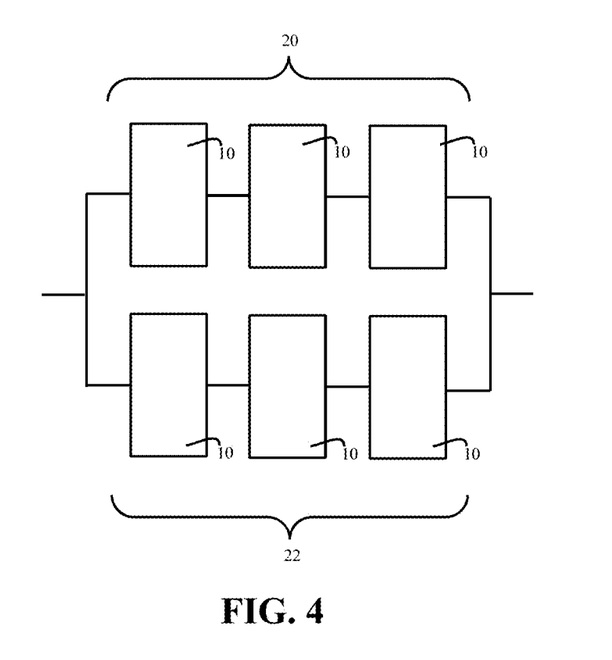
FIG. 4 schematically illustrates a battery comprising multiple electrochemical cells connected in series and parallel.

FIG. 3 schematically illustrates a cross-sectional view of lithium-ion electrochemical cell 10 comprising cathode 12, and anode 14, with porous separator membrane 16 therebetween. Electrolyte 18, comprising a solution of a lithium salt in a non-aqueous solvent contacts electrodes 12 and 14 and separator membrane 16. The electrodes, separator and electrolyte are sealed within housing 19. FIG. 4 schematically illustrates a lithium-ion battery comprising a first bank 20 consisting of three series-connected electrochemical cells 10, and a second bank 22 consisting of three series-connected electrochemical cells 10, in which first bank 20 is electrically connected to second bank 22 in parallel.

Preferably, the surface treated LMO electrode materials described herein comprise at least about 50 percent by weight (wt %) of the formed cathode. Optionally, the formed cathode can comprise up to about 40 wt % carbon (e.g., carbon black, graphite, carbon nanotubes, carbon microspheres, carbon nanospheres, or any other form of particulate carbon) to enhance the electronic conductivity of the electrode. An electrochemically inert polymeric binder (e.g., polyvinylidene difluoride, PVDF) can be included to bind the electrode material and any carbon particles together, and/or to adhere the materials to a current collector (e.g., a metal foil, such as Al foil).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A surface-treated lithium metal oxide (LMO) cathode material comprising: (a) particles of an LMO material capable of releasing and receiving lithium ions during discharging and charging, respectively, of a lithium ion electrochemical cell; and (b) a compound of empirical Formula (I) on at least the surface of the LMO particles:

$$Li_xM'_nM''_mA_z;\qquad(I):$$

wherein:
$1 \leq x \leq 3$;
$2 \leq z \leq 4$;
$0.5 \leq n \leq 2$;
$0.05 \leq m \leq 1$;
$m < n$;
$0.05 \leq n+m \leq 3$;
M' comprises one or more metals with oxidation states of 5+ or 6+, and having an average oxidation state, w, wherein $5 \leq w \leq 6$;
M" comprises one or more metals with oxidation states of 2+ or 3+, and having an average oxidation state, t, wherein $2 \leq t \leq 3$;
A comprises one or more anions having an average oxidation state or formal charge, v, wherein $-3 < v < -1$; and
$x + (n)(w) + (m)(t) = -(v)(z)$.

2. The cathode material of claim 1, wherein A is selected from the group consisting of $O^{2-}$, $F^-$, $N^{2-}$, a phosphate ion, and a combination of two or more thereof.

3. The cathode material of claim 1, wherein A is $O^{2-}$.

4. The cathode material of claim 1, wherein $0.7 \leq n \leq 1$.

5. The cathode material of claim 1, wherein $0.2 \leq m \leq 0.8$.

6. The cathode material of claim 1, wherein $1 \leq n+m \leq 2.5$.

7. The cathode material of claim 1, wherein M' comprises one or more metals selected from the group consisting of W(VI), Nb(V), Sb(V), and Ta(V).

8. The cathode material of claim 1, wherein M' comprises W(VI).

9. The cathode material of claim 1, wherein M" comprises one or more metals selected from the group consisting of Ni(II), Mg(II), Al(III) Ga(III), Y(III), and La(III).

10. The cathode material of claim 1, wherein M" comprises Al(III).

11. The cathode material of claim 1, wherein the compound of Formula (I) comprises $Li_2W_{0.85}Al_{0.3}O_4$.

12. The cathode material of claim 1, wherein the LMO comprises one or more materials selected from the group consisting of $Li_{1+p}MO_2$ ($0<p<0.3$), $LiMO_2$, $Li_2MO_3$, $LiM_2O_4$, and an integrated composite of two or more thereof; and wherein M comprises one or more transition metal ions.

13. The cathode material of claim 12, wherein M comprises one or more transition metals selected from Mn, Ni, and Co.

14. The cathode material of claim 1, wherein the LMO comprises $LiMO_2$; and wherein M comprises one or more transition metals selected from Mn, Ni, and Co.

15. The cathode material of claim 1, wherein the LMO material comprises $LiCoO_2$ and the compound of Formula (I) comprises $Li_2W_{0.85}Al_{0.3}O_4$.

16. The cathode material of claim 1, wherein M' is one or more metals having an average oxidation state of +6; M' comprises W(VI); and A is $O^{2-}$.

17. The cathode material of claim 1, wherein M' is one or more metals having an average oxidation state of +5; and A is $O^{2-}$.

18. The cathode material of claim 17, wherein M' comprises one or more of Nb(V), Sb(V), and Ta(V).

19. An electrochemical cell comprising a cathode, an anode and a porous separator membrane therebetween, with a lithium-containing non-aqueous electrolyte contacting the anode, the cathode, and the membrane, wherein the cathode comprises a cathode material of claim 1.

20. A battery comprising a plurality of electrochemical cells of claim 19 electrically connected together in series, parallel, or a combination of series and parallel.

* * * * *

UNITED STATES PATENT AND TRADEMARK OFFICE
CERTIFICATE OF CORRECTION

PATENT NO.         : 10,431,820 B2
APPLICATION NO.    : 15/645678
DATED              : October 1, 2019
INVENTOR(S)        : Jason Croy, Mahalingam Balasubramanian and Joong Sun Park Page 1 of 1

It is certified that error appears in the above-identified patent and that said Letters Patent is hereby corrected as shown below:

In the Claims

Claim 1, Column 12, Line 37, delete "$-3 < v < -1$" and insert -- $-3 \leq v \leq -1$ --.

Signed and Sealed this
Fourteenth Day of April, 2020

Andrei Iancu
*Director of the United States Patent and Trademark Office*